(12) United States Patent
Ikemoto et al.

(10) Patent No.: US 9,269,038 B2
(45) Date of Patent: Feb. 23, 2016

(54) ANTENNA DEVICE, CARD-TYPE COMMUNICATION DEVICE, AND COMMUNICATION TERMINAL APPARATUS

(71) Applicant: Murata Manufacturing Co., Ltd., Nagaokakyo-shi, Kyoto-fu (JP)

(72) Inventors: Nobuo Ikemoto, Nagaokakyo (JP); Toshiyuki Nakaiso, Nagaokakyo (JP); Naoki Gouchi, Nagaokakyo (JP); Naoto Ikeda, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 14/278,100

(22) Filed: May 15, 2014

(65) Prior Publication Data
US 2014/0246504 A1  Sep. 4, 2014

Related U.S. Application Data

(63) Continuation of application No. PCT/JP2013/051132, filed on Jan. 22, 2013.

(30) Foreign Application Priority Data

Jan. 30, 2012  (JP) .................. 2012-016066

(51) Int. Cl.
*G06K 19/073* (2006.01)
*H01Q 7/00* (2006.01)
*G06K 19/077* (2006.01)

(52) U.S. Cl.
CPC ........ *G06K 19/073* (2013.01); *G06K 19/07779* (2013.01); *G06K 19/07794* (2013.01); *H01Q 7/005* (2013.01)

(58) Field of Classification Search
CPC .......... G06K 19/073; G06K 19/07794; G06K 19/07779; H01Q 7/005
See application file for complete search history.

(56) References Cited

U.S. PATENT DOCUMENTS

| | | | |
|---|---|---|---|
| 2006/0089116 A1 | 4/2006 | Yamazaki | |
| 2006/0267769 A1* | 11/2006 | Ito et al. | .................. 340/572.1 |
| 2007/0285255 A1 | 12/2007 | Tsushima et al. | |
| 2009/0102663 A1* | 4/2009 | Hillegass | .................. 340/572.5 |
| 2011/0241440 A1* | 10/2011 | Sakoda et al. | ................. 307/104 |
| 2012/0248186 A1 | 10/2012 | Chauvet | |

FOREIGN PATENT DOCUMENTS

| | | |
|---|---|---|
| JP | 3-2711 U | 1/1991 |
| JP | 4-239205 A | 8/1992 |

(Continued)

OTHER PUBLICATIONS

Official Communication issued in International Patent Application No. PCT/JP2013/051132, mailed on Apr. 23, 2013.

(Continued)

*Primary Examiner* — Kristy A Haupt
(74) *Attorney, Agent, or Firm* — Keating & Bennett, LLP

(57) ABSTRACT

An antenna device includes an antenna resonance circuit connected to a power supply circuit and a variable-frequency resonance element including a resonance circuit which is coupled with the antenna resonance circuit via an electromagnetic field. The resonant frequency of the resonance circuit is variable within a predetermined frequency band.

15 Claims, 10 Drawing Sheets

(56) References Cited

FOREIGN PATENT DOCUMENTS

| JP | 2006-121444 A | 5/2006 |
| JP | 2006-238398 A | 9/2006 |
| JP | 2010-154255 A | 7/2010 |
| JP | 2011-66759 A | 3/2011 |
| WO | 2010/137061 A1 | 12/2010 |
| WO | 2011/067084 A1 | 6/2011 |

OTHER PUBLICATIONS

Official Communication issued in corresponding Japanese Patent Application No. 2013-556321, mailed on Feb. 3, 2015.
Official Communication issued in corresponding Japanese Patent Application No. 2013-556321, mailed on Jun. 9, 2015.

* cited by examiner

ANTENNA DEVICE, CARD-TYPE COMMUNICATION DEVICE, AND COMMUNICATION TERMINAL APPARATUS

BACKGROUND OF THE INVENTION

1. Field of the Invention

The present invention relates to an antenna device, a card-type communication device, and a communication terminal apparatus for use in, for example, an RFID (Radio Frequency Identification) system.

2. Description of the Related Art

These days, an RFID system is being developed as a product management system. In such an RFID system, non-contact communication is performed between a reader/writer for generating an electromagnetic induction field and an IC chip (also referred to as an "RFID tag", "wireless IC chip", or "wireless communication device") attached to a product or a container and storing predetermined information therein, so that information can be transferred between the reader/writer and the IC chip. In this RFID system, an HF band (high frequency signal at 13 MHz) is generally used.

In an RFID system using an HF band, a coil antenna is used as an antenna element for each of a reader/writer and an RFID tag. However, when the coil antenna of the RFID tag is brought close to the coil antenna of the reader/writer, a state (null state) in which communication is not established at a certain point (null point) may occur even if the RFID tag and the reader/writer are located within an area where communication can be established. The reason why this state occurs is that the two coil antennas repel each other so as to shift the resonant frequency or the phase, or that, when a conductor or a dielectric is brought close to the RFID tag, the resonant frequency of the coil antenna of the RFID tag is shifted. The resonant frequency is increased if a conductor is brought close to the RFID tag, while the resonant frequency is decreased if a dielectric is brought close to the RFID tag.

With this background, Japanese Unexamined Patent Application Publication No. 2006-238398 and Japanese Unexamined Patent Application Publication No. 2010-154255, for example, disclose a technique for preventing the occurrence of a null state in the following manner. A switching device or an oscillator is connected to a coil antenna, and by sequentially changing the state of the switching device or by sequentially changing the oscillation frequency of the oscillator, the resonant frequency of the coil antenna itself is shifted. In this case, however, since the resonant frequency of the coil antenna itself is shifted, the Q factor of the coil antenna is reduced, or noise of the switching device or the oscillator is superposed on the coil antenna.

SUMMARY OF THE INVENTION

Preferred embodiments of the present invention provide an antenna device exhibiting excellent electrical characteristics in which the occurrence of a null state is prevented while significantly reducing or preventing a decrease in the Q factor of a coil antenna and reducing noise, and also provide a card-type communication device and a communication terminal apparatus.

An antenna device according to a preferred embodiment of the present invention includes an antenna resonance circuit connected to a power supply circuit; and a variable-frequency resonance element including a resonance circuit which is coupled with the antenna resonance circuit via an electromagnetic field, a resonant frequency of the resonance circuit being variable within a predetermined frequency band.

A card-type communication device according to another preferred embodiment of the present invention is used with an IC card including an antenna resonance circuit connected to a power supply circuit. The card-type communication device includes a variable-frequency resonance element including a resonance circuit which is coupled with the antenna resonance circuit via an electromagnetic field, a resonant frequency of the resonance circuit being variable within a predetermined frequency band.

A communication terminal apparatus according to a further preferred embodiment of the present invention includes an antenna resonance circuit connected to a power supply circuit. The communication terminal apparatus includes a variable-frequency resonance element including a resonance circuit which is coupled with the antenna resonance circuit via an electromagnetic field, a resonant frequency of the resonance circuit being variable within a predetermined frequency band.

In the above-described antenna device, the variable-frequency resonance element having a resonant frequency which is variable in a predetermined frequency band is coupled with the antenna resonance circuit via an electromagnetic field. Accordingly, when the frequency of the variable-frequency resonance element sweeps, the resonant frequency of the antenna resonance circuit also sweeps. Thus, the occurrence of a null state is prevented, and communication is performed with a frequency in a stable state. Particularly, since the antenna resonance circuit and the variable-frequency resonance element are coupled with each other via an electromagnetic field (they are not directly connected with a DC), a decrease in the Q factor of the coil antenna is significantly reduced or prevented and noise is significantly reduced or prevented, thus providing an antenna device exhibiting excellent electrical characteristics.

According to various preferred embodiments of the present invention, it is possible to prevent the occurrence of a null state while significantly reducing or preventing a decrease in the Q factor of a coil antenna and reducing noise.

The above and other elements, features, steps, characteristics and advantages of the present invention will become more apparent from the following detailed description of the preferred embodiments with reference to the attached drawings.

BRIEF DESCRIPTION OF THE DRAWINGS

FIGS. 1A-1C show an antenna device of a first preferred embodiment of the present invention, wherein FIG. 1A is a perspective view; FIG. 1B is an equivalent circuit diagram; and FIG. 1C is a circuit diagram of a variable-frequency resonance element.

FIGS. 11A and 11B show an antenna device of a sixth preferred embodiment of the present invention, wherein FIG. 11A is a perspective view; and FIG. 11B is an equivalent circuit diagram.

FIGS. 12A and 12B show a communication terminal apparatus including the antenna device of the sixth preferred embodiment of the present invention, wherein FIG. 12A is a schematic plan view; and FIG. 12B is a sectional view.

DETAILED DESCRIPTION OF THE PREFERRED EMBODIMENTS

Figure 1A:
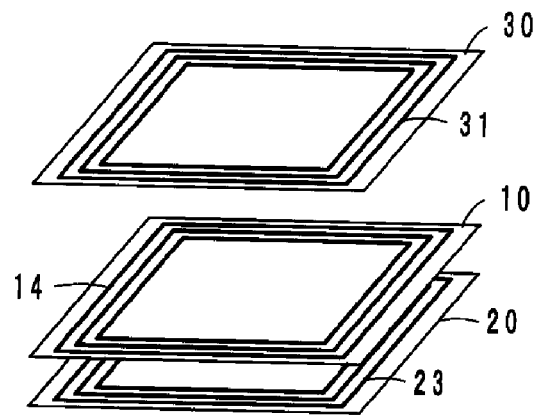

Preferred embodiments of an antenna device, a card-type communication device, and a communication terminal apparatus according to the present invention will be described below with reference to the accompanying drawings. In the drawings, the same components and the same elements are designated by like reference numerals, and an explanation of the same component or the same element will be given only once.

First Preferred Embodiment

Figure 1B:
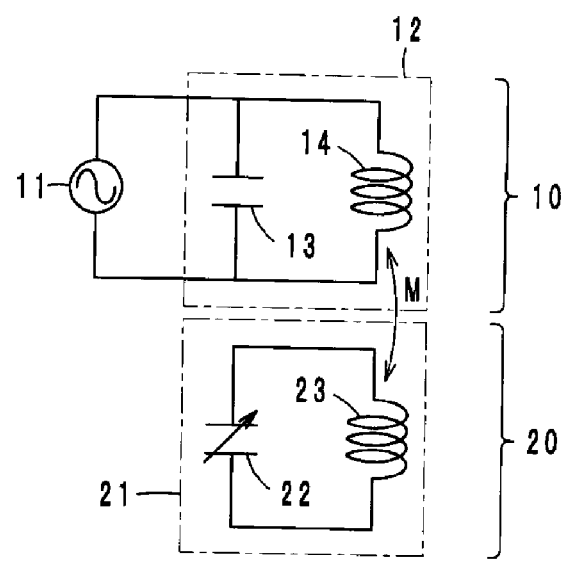
Figure 1C:
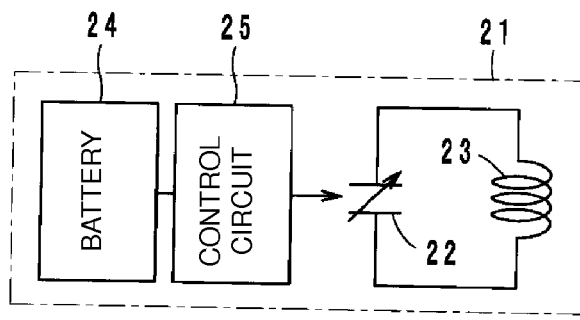

An antenna device of a first preferred embodiment of the present invention includes, as shown in FIGS. 1A-1C, a card-type wireless communication tag 10 and a card-type communication device which has a variable-frequency resonance element 21. The wireless communication tag 10 includes an antenna resonance circuit 12 connected to a power supply circuit 11. The antenna resonance circuit 12 preferably includes a capacitor 13 and a coil antenna 14 connected in parallel with each other. The coil antenna 14 preferably includes a coil pattern including at least one loop conductor, and defines and serves as a radiation element which is capable of sending and receiving HF-band high frequency signals.

The power supply circuit 11 is constituted by an RFID IC chip and includes a memory circuit or a logic circuit. The power supply circuit 11 may be configured by a bare chip IC or a package IC.

The variable-frequency resonance element 21 includes a parallel resonance circuit preferably including a variable capacitor element 22 and a coil element 23 connected in parallel with each other. The variable capacitor element 22 is connected to a control circuit 25 including a battery 24. This parallel resonance circuit is coupled with the above-described antenna resonance circuit 12 via an electromagnetic field. The coil element 23 is constituted by a coil pattern including at least one loop conductor, and is coupled with the coil antenna 14 in a magnetic field M.

In the parallel resonance circuit, the resonant frequency is variable within a predetermined frequency band by continuously changing the capacitance value of the variable capacitor element 22 (e.g., an element known as, for example, a varicap) by receiving a drive voltage applied from the control circuit 25. As the control circuit 25, for example, a DA converter, is preferably used, and more specifically, a converter that can continuously change a voltage at a certain period is preferably used. In the configuration shown in FIG. 1C, the drive voltage is supplied from a small battery 24, such as a coil-type battery.

The wireless communication tag 10 and the card-type communication device 20 are used by being superposed on each other (in the state in which the coil antenna 14 and the coil element 23 are coupled with each other in a magnetic field M).

A coil-shaped antenna 31 of a reader/writer 30 is then brought close to the wireless communication tag 10 and the card-type communication device 20 (see FIG. 1A), so that the antenna 31 of the reader/writer 30 and the coil antenna 14 of the wireless communication tag 10 are coupled with each other, thus sending and receiving high frequency signals therebetween.

Figure 2A:
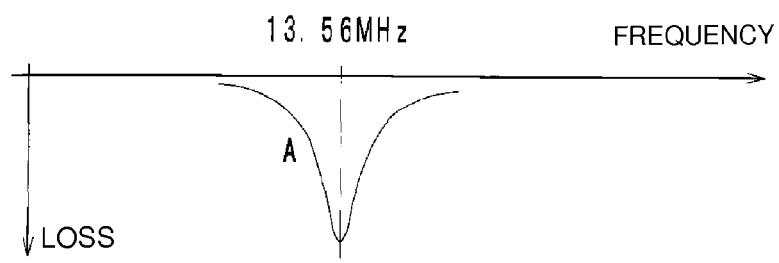
FIGS. 2A-2C show chart diagrams indicating frequency characteristics of the antenna device of the first preferred embodiment of the present invention.
Figure 2B:
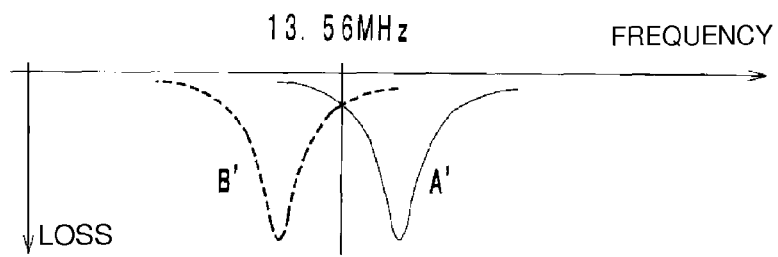

The resonant frequency of the wireless communication tag 10 alone is adjusted to an operating frequency of about 13.56 MHz, for example, as indicated by a curve A in FIG. 2A. When the antenna 31 of the reader/writer 30 is brought close to the wireless communication tag 10 alone, the antenna 31 and the wireless communication tag 10 repel each other, thus shifting the resonant frequency of the wireless communication tag 10 to a curve A' and the resonant frequency of the antenna 31 of the reader/writer 30 to a curve B', as shown in FIG. 2B. In contrast, as in the first preferred embodiment, the wireless communication tag 10 and the card-type communication device 20 (variable-frequency resonance element 21) are superposed on each other and are magnetically coupled with each other. Accordingly, when the resonant frequency of the variable-frequency resonance element 21 sweeps within a frequency band X near the operating frequency, as indicated by a curve C in FIG. 2C, the resonant frequency of the wireless communication tag 10 resonates and also sweeps (see a curve A' and a frequency band Y in FIG. 2C). As a result, a timing at which the wireless communication tag 10 can communicate with the antenna 31 of the reader/writer 30 is generated.

That is, in the known art, the resonant frequency of the wireless communication tag 10 is fixed. Accordingly, if the resonant frequency deviates from an operating frequency, a null point is produced. In the first preferred embodiment of the present invention, however, since the resonant frequency of the wireless communication tag 10 sweeps due to the coupling with the variable-frequency resonance element 21, the occurrence of a null point is prevented, and a stable communication state is maintained. Additionally, the antenna resonance circuit 12 of the wireless communication tag 10 and the variable-frequency resonance element 21 are coupled with each other via an electromagnetic field, thus significantly reducing or preventing a decrease in the Q factor of the coil antenna 14 and reducing noise. The coil element 23 may be smaller than external dimensions of the coil antenna 14 as long as it can be magnetically coupled with the coil antenna 14.

Additionally, it is not necessary any more to adjust the resonant frequency of the coil antenna 14 with a narrow deviation. Accordingly, the number of manufacturing steps for the wireless communication tag 10 is reduced, and an antenna with a wide deviation is able to be utilized. For example, even if plural wireless communication tags 10 are put in a wallet, it is sufficient that only one card-type communication device 20 including a variable-frequency resonance element 21 is superposed on the plural wireless communication tags 10. Then, each of the plural wireless communication tags 10 send and receive information to and from the reader/writer 30. This will be described later in a fifth preferred embodiment of the present invention.

Figure 3A:
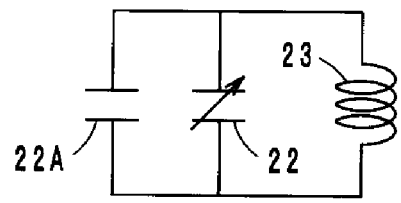
FIGS. 3A-3D show various circuit diagrams of a resonance circuit of the variable-frequency resonance element.
Figure 3B:
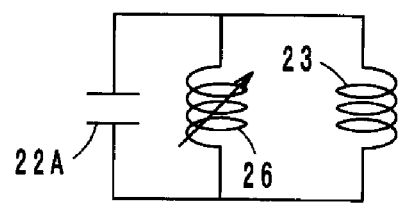
Figure 3C:
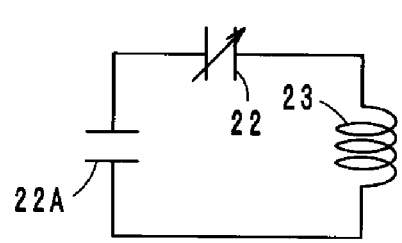
Figure 3D:
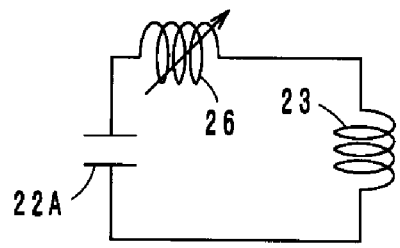

Various circuit configurations other than the configuration shown in FIG. 1B may be used for the resonance circuit of the variable-frequency resonance element 21. For example, FIG. 3A shows a resonance circuit in which each of a capacitor element 22A and a variable capacitor element 22 is connected in parallel with the coil element 23. FIG. 3B shows a resonance circuit in which each of a capacitor element 22A and a variable inductor element 26 is connected in parallel with the coil element 23. FIG. 3C shows a resonance circuit in which each of a capacitor element 22A and a variable capacitor element 22 is connected in series with the coil element 23. FIG. 3D shows a resonance circuit in which each of a capacitor element 22A and a variable inductor element 26 is connected in series with the coil element 23.

Figure 4:
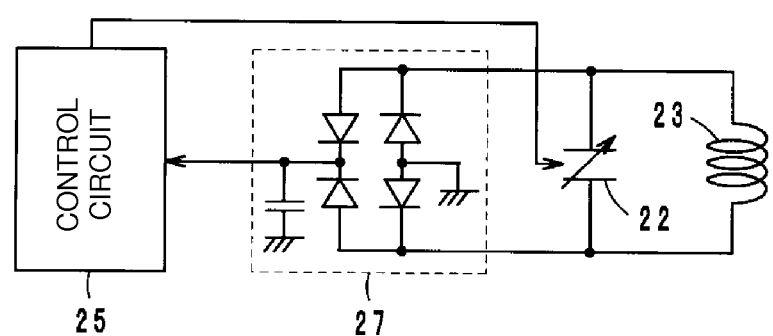
FIG. 4 is a circuit diagram of another example of the variable-frequency resonance element.

The control circuit 25 may utilize power rectified from a high frequency signal radiated from the antenna 31 of the reader/writer 30. For example, as shown in FIG. 4, a bridge rectifier circuit 27 may preferably include four diodes and may be inserted between the resonance circuit and the control circuit 25. A high frequency signal radiated from the antenna 31 of the reader/writer 30 is input into the coil element 23, and a rectified current is supplied to the control circuit 25.

Second Preferred Embodiment

Figure 5:
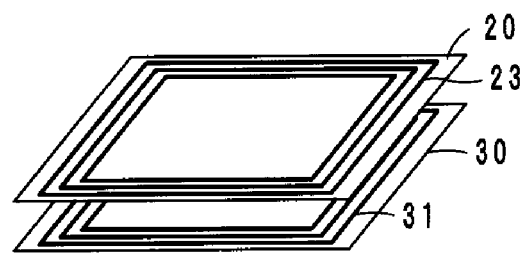
FIG. 5 is a perspective view of an antenna device of a second preferred embodiment of the present invention.
Figure 5:

An antenna device of a second preferred embodiment of the present invention is used, as shown in FIG. 5, by superposing the card-type communication device 20 (variable-frequency resonance element 21) discussed in the first preferred embodiment on the card-type antenna 31 of the reader/writer 30. In this case, when the resonant frequency of the variable-frequency resonance element 21 sweeps within the frequency band X near the operating frequency, as indicated by the curve in FIG. 2C, the resonant frequency of the antenna 31 of the reader/writer 30 also sweeps, thus generating a timing at which the antenna 31 of the reader/writer 30 can communicate with the coil antenna 14 of the wireless communication tag 10.

Third Preferred Embodiment

Figure 6A:
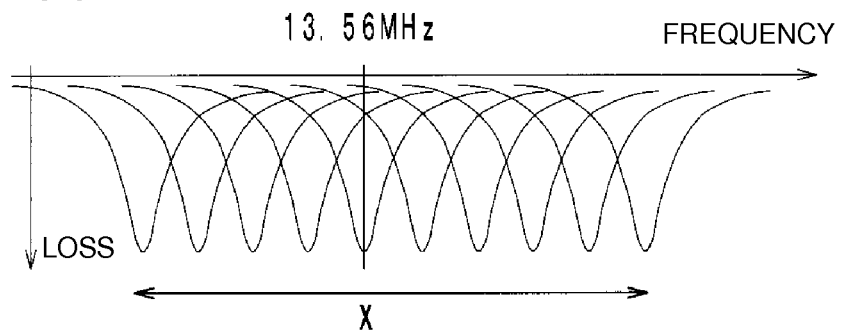
FIGS. 6A-6C shows chart diagrams indicating frequency characteristics of an antenna device of a third preferred embodiment of the present invention.

An antenna device of a third preferred embodiment of the present invention is used by electromagnetically coupling the coil antenna 14 and the coil element 23 by superposing the wireless communication tag 10 on the card-type communication device 20 (variable-frequency resonance element 21), as in the first preferred embodiment. In the third preferred embodiment, the resonant frequency band of the variable-frequency resonance element 21 is shifted within a range from a frequency lower than about 13.56 MHz, for example, which is the operating frequency, to a frequency higher than about 13.56 MHz, for example, by including the resonant frequency of the antenna resonance circuit 12 (see FIG. 6A).

Figure 6B:
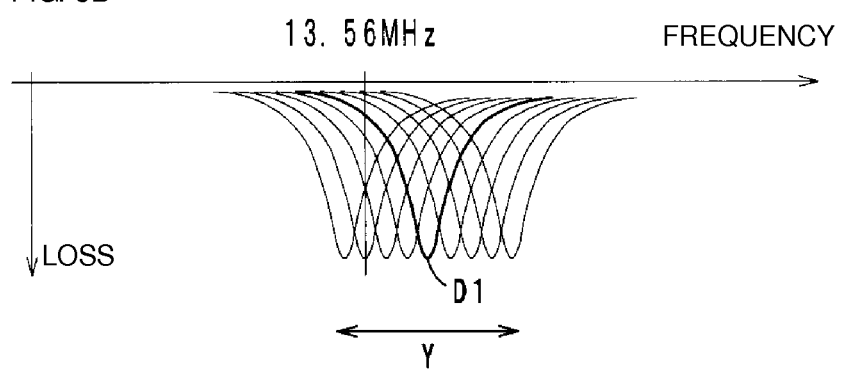
Figure 6C:
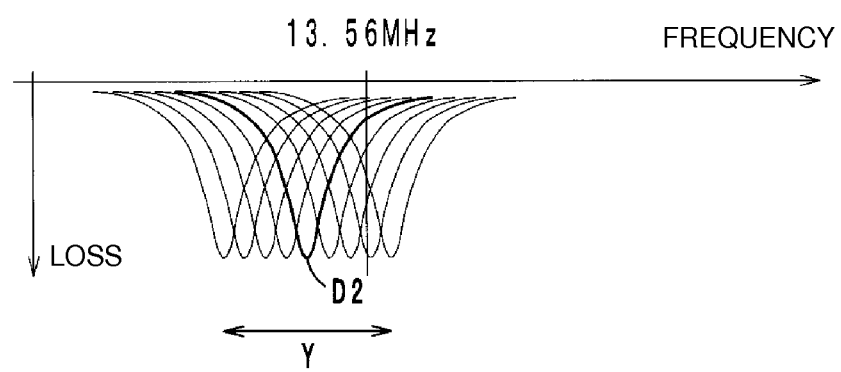

With this arrangement, regardless of whether the resonant frequency of the wireless communication tag 10 is shifted to a frequency higher than the operating frequency (see a curve D1 in FIG. 6B) or to a frequency lower than the operating frequency (see a curve D2 in FIG. 6C) due to the influence of surrounding environments, when the resonant frequency of the variable-frequency resonance element 21 sweeps within the band X, the resonant frequency of the wireless communication tag 10 also sweeps in the band Y. As a result, a timing at which the resonant frequency is adjusted to about 13.56 MHz is generated, thus preventing the occurrence of a null point.

Fourth Preferred Embodiment

Figure 7:
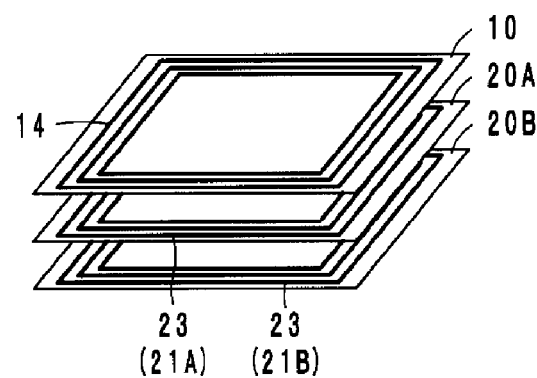
FIG. 7 is a perspective view of an antenna device of a fourth preferred embodiment of the present invention.
Figure 8A:
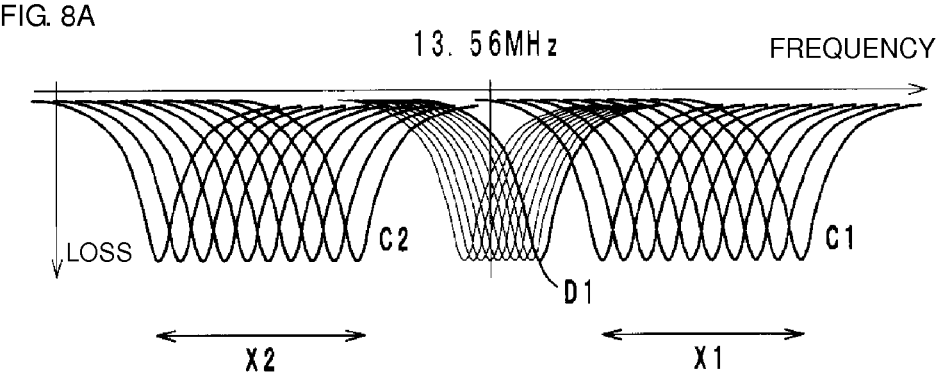
FIGS. 8A and 8B show chart diagrams indicating frequency characteristics of the antenna device of the fourth preferred embodiment of the present invention.

An antenna device of a fourth preferred embodiment of the present invention is used, as shown in FIG. 7, by superposing card-type communication devices 20A and 20B including variable-frequency resonance elements 21A and 21B, respectively, on one wireless communication tag 10. The resonant frequency of the first variable-frequency resonance element 21A sweeps in a band X1 higher than about 13.56 MHz, for example, which is the operating frequency, as indicated by a curve C1 in FIG. 8A, while the resonant frequency of the second variable-frequency resonance element 21B sweeps in a band X2 lower than about 13.56 MHz, for example, as indicated by a curve C2 in FIG. 8A.

Figure 8B:
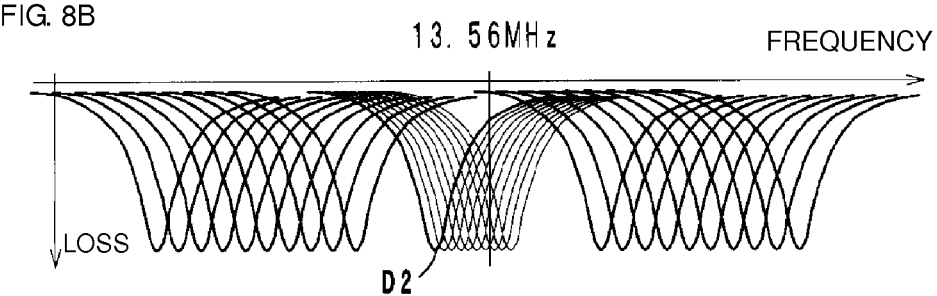

If the resonant frequency of the wireless communication tag 10 is shifted to a higher band (see a curve D1 in FIG. 8A), a timing at which the resonant frequency of the wireless communication tag 10 is adjusted to about 13.56 MHz, for example, is generated due to the influence of the sweeping of the resonant frequency of the first variable-frequency resonance element 21A. If the resonant frequency of the wireless communication tag 10 is shifted to a lower band (see a curve D2 in FIG. 8B), a timing at which the resonant frequency of the wireless communication tag 10 is adjusted to about 13.56 MHz, for example, is generated due to the influence of the sweeping of the resonant frequency of the second variable-frequency resonance element 21B. In either of the above-described cases, the occurrence of a null point is reliably prevented.

Fifth Preferred Embodiment

Figure 9:
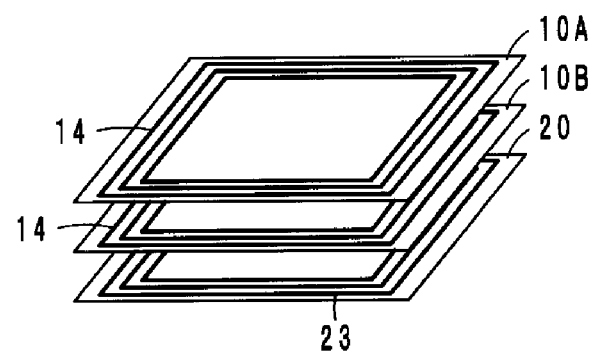
FIG. 9 is a perspective view of an antenna device of a fifth preferred embodiment of the present invention.

An antenna device of a fifth preferred embodiment of the present invention is used, as shown in FIG. 9, by superposing one card-type communication device 20 (variable-frequency resonance element 21) on plural (for example, two in this preferred embodiment) wireless communication tags 10A and 10B.

Figure 10A:
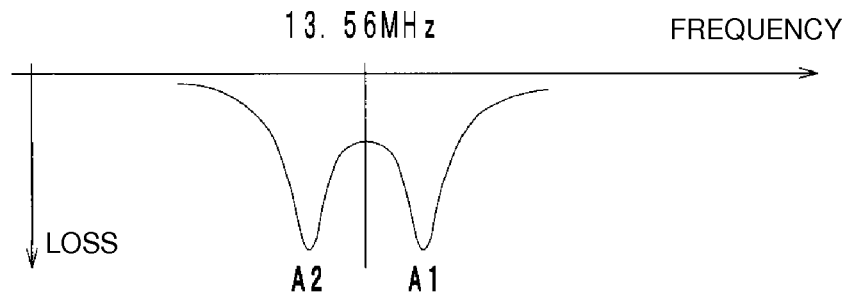
FIGS. 10A-10C' show chart diagrams indicating frequency characteristics of the antenna device of the fifth preferred embodiment of the present invention.
Figure 10B:
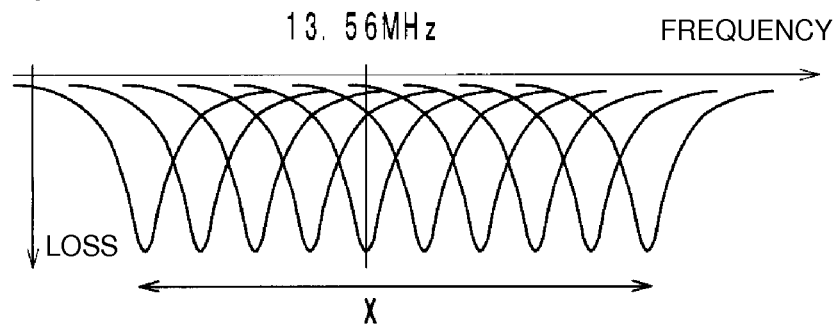
Figure 10C:
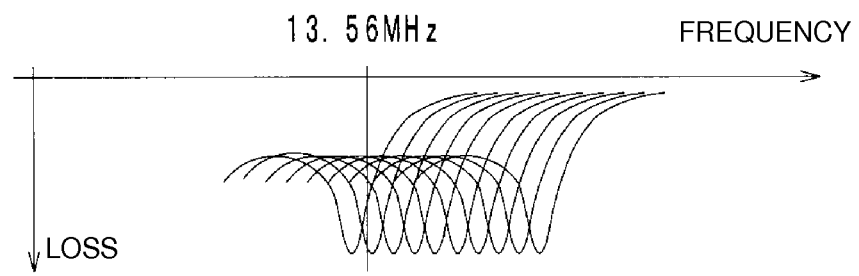
Figure 10C:
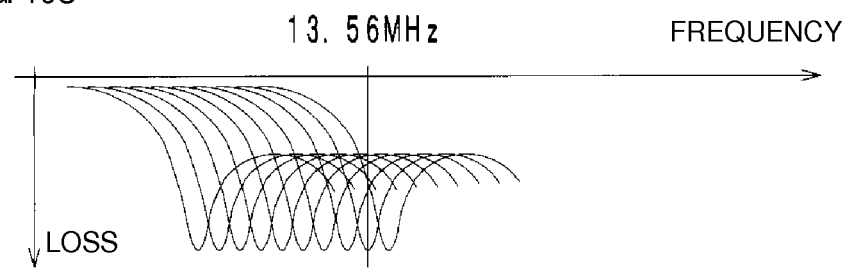

Concerning the two wireless communication tags 10A and 10B, as shown in FIG. 10A, two resonance points A1 and A2 deviating from each other may be produced. Accordingly, a variable band of the resonant frequency of the variable-frequency resonance element 21 is set in a wider range (see a band X in FIG. 10B) by including the resonance points A1 and A2. With this arrangement, due to the influence of the sweeping of the resonant frequency of the variable-frequency resonance element 21, both of the resonant frequencies of the two wireless communication tags 10A and 10B also sweep (see FIGS. 10C and 10C'). Thus, a timing at which the resonant frequencies of the wireless communication tags 10A and 10B are adjusted to about 13.56 MHz, for example, is generated, thus preventing the occurrence of a null point.

Sixth Preferred Embodiment

Figure 11A:
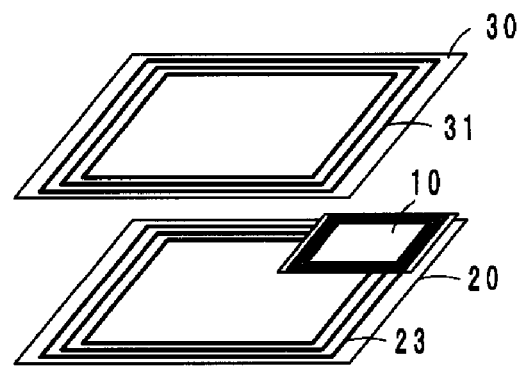
Figure 11B:
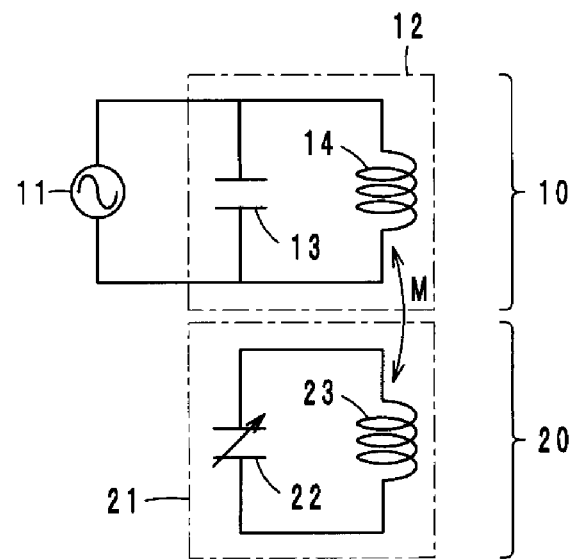

As shown in FIG. 11A, an antenna device of a sixth preferred embodiment of the present invention includes a small wireless communication tag 10 and a card-type communication device 20 having a larger area than that of the wireless communication tag 10. External dimensions of the coil element 23 of the variable-frequency resonance element 21 integrated in the card-type communication device 20 are larger than those of the antenna coil 14 of the wireless communication tag 10, and the coil element 23 defines and serves as a booster antenna for the antenna coil 14. The basic configurations of the wireless communication tag 10 and the variable-frequency resonance element 21 of the sixth preferred embodiment are similar to those of the first preferred embodiment.

Figure 12A:
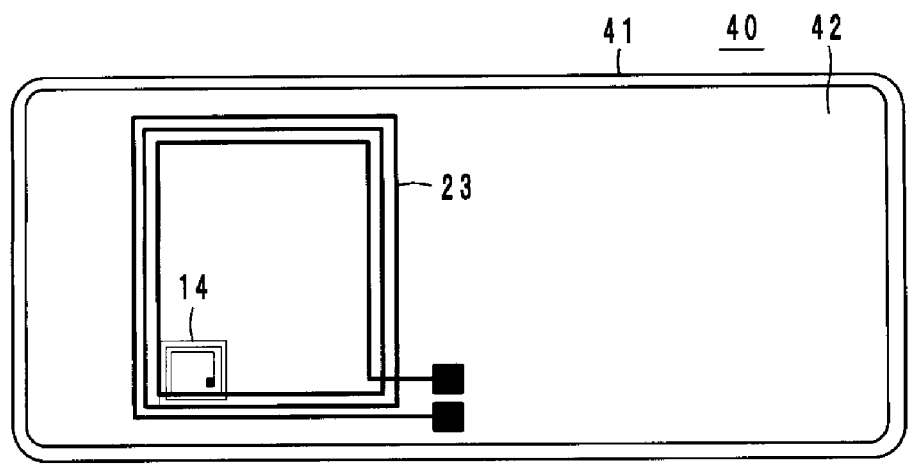
Figure 12B:
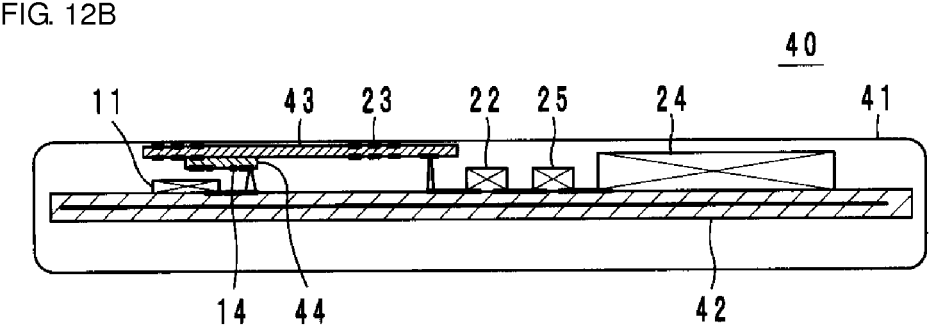

This antenna device is preferably mounted on a communication terminal apparatus, such as a cellular phone. More specifically, as shown in FIGS. 12A and 12B, the battery 24, the control circuit 25, and the variable capacitor element 22 are mounted on a printed circuit board 42 integrated in a casing 41 of a communication terminal apparatus 40, and the coil element 23 (booster antenna) is mounted on a substrate 43. The power supply circuit 11 is also mounted on the printed circuit board 42. The coil antenna 14 is disposed on a small substrate 44 and is electromagnetically coupled with the coil element 23.

Figure 2C:
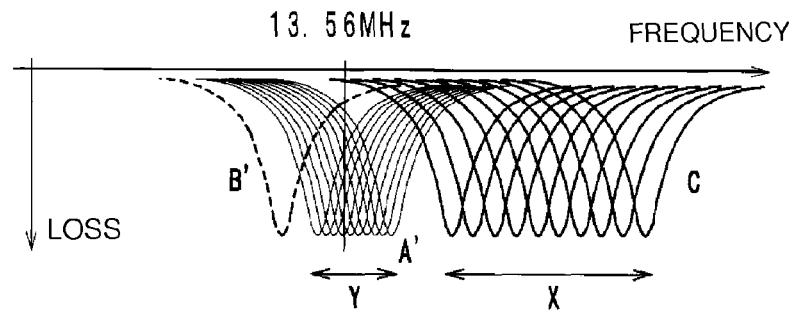

Frequency characteristics in the sixth preferred embodiment are similar to those shown in FIGS. 2A-2C discussed in the first preferred embodiment. That is, the resonant frequency of the wireless communication tag 10 alone including a booster antenna is adjusted to the operating frequency of about 13.56 MHz, for example, as indicated by the curve A in FIG. 2A. When the antenna 31 of the reader/writer 30 is brought close to the wireless communication tag 10 alone, the antenna 31 and the wireless communication tag 10 repel each other, thus shifting the resonant frequency of the wireless communication tag 10 to a curve A' and the resonant frequency of the antenna 31 of the reader/writer 30 to a curve B', as shown in FIG. 2B. In contrast, as in the sixth preferred embodiment, the wireless communication tag 10 and the card-type communication device 20 (variable-frequency resonance element 21) are superposed on each other and are magnetically coupled with each other. Accordingly, when the resonant frequency of the variable-frequency resonance element 21 sweeps within a frequency band near the operating frequency, as indicated by the curve C in FIG. 2C, the resonant frequency of the wireless communication tag 10 resonates and also sweeps (see the curve A' and the frequency band Y in FIG. 2C). As a result, a timing at which the wireless communication tag 10 can communicate with the antenna 31 of the reader/writer 30 is generated. The other operations and advantages of the sixth preferred embodiment are similar to those of the first preferred embodiment.

Other Preferred Embodiments

The antenna device, the card-type communication device, and the communication terminal apparatus according to the present invention are not restricted to those in the above-described preferred embodiments, and may be changed in various modes within the spirit of the present invention.

In particular, various configurations may be used for the antenna resonance circuit of the wireless communication tag and the resonance circuit of the variable-frequency resonance element. Additionally, the present invention is not restricted to an antenna device used for an RFID system in an HF band, and may be applicable to another frequency band, such as a UHF band, or another communication system.

As described above, preferred embodiments of the present invention preferably are effectively used as an antenna device, a card-type communication device, and a communication terminal apparatus, for example. Preferred embodiments of the present invention are particularly excellent in preventing the occurrence of a null state while significantly reducing or preventing a decrease in the Q factor of a coil antenna and reducing noise.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An antenna device comprising:
a wireless communication tag including an antenna resonance circuit connected to an RFID IC chip and having a fixed resonant frequency, the antenna resonance circuit including a first coil defining a radiation element capable of sending and receiving a high-frequency signal with a reader/writer; and
a variable-frequency resonance element, which is an additional device to the wireless communication tag, including a variable-frequency resonance circuit including a second coil being coupled with the first coil via an electromagnetic field and also including a control circuit configured to sweep a resonant frequency of the variable-frequency resonance circuit within a predetermined frequency band so as to sweep a resonant frequency of the antenna resonance circuit.

2. The antenna device according to claim 1, wherein:
the variable-frequency resonance element further includes a variable capacitor.

3. The antenna device according to claim 2, wherein the variable-frequency resonance element further includes a battery and a control circuit, the control circuit being connected to the variable-frequency resonance element.

4. The antenna device according to claim 3, wherein the control circuit is configured utilize as power, a current rectified from a high frequency signal radiated from an antenna of the reader/writer.

5. The antenna device according to claim 1, wherein a variable frequency band of the variable-frequency resonance element covers the resonant frequency of the antenna resonance circuit.

6. A card communication device for use with an IC card including a wireless communication tag including an antenna resonance circuit connected to an RFID chip and having a fixed resonant frequency, the antenna resonance circuit including a first coil defining a radiation element capable of sending and receiving a high-frequency signal with a reader/writer, the card communication device comprising:
a variable-frequency resonance element, which is an additional device to the wireless communication tag, including a variable-frequency resonance circuit including a second coil being coupled with the first coil via an electromagnetic field and also including a control circuit configured to sweep a resonant frequency of the variable frequency resonance circuit within a predetermined frequency band so as to sweep the resonant frequency of the antenna resonance circuit.

7. The card communication device according to claim 6, wherein:
the variable-frequency resonance element further includes a variable capacitor.

8. The card communication device according to claim 7, wherein the variable-frequency resonance element further includes a battery and a control circuit, the control circuit being connected to the variable-frequency resonance element.

9. The card communication device according to claim 8, wherein the control circuit is configured utilize as power, a current rectified from a high frequency signal radiated from an antenna of the reader/writer.

10. The card communication device according to claim 6, wherein a variable frequency band of the variable-frequency resonance element covers the resonant frequency of the antenna resonance circuit.

11. A communication terminal apparatus including a wireless communication tag including an antenna resonance circuit connected to an RFID chip and having a fixed resonant frequency, the antenna resonance circuit including a first coil defining a radiation element capable of sending and receiving a high-frequency signal with a reader/writer, the communication terminal apparatus comprising:
a variable-frequency resonance element, which is an additional device to the wireless communication tag, including a variable-frequency resonance circuit including a second coil being coupled with first coil via an electromagnetic field and also including a control circuit configured to sweep a resonant frequency of the variable-frequency resonance circuit within a predetermined frequency band so as to sweep the resonant frequency of the antenna resonance circuit.

12. The communication terminal apparatus according to claim 11, wherein:
the variable-frequency resonance element further includes a variable capacitor.

13. The communication terminal apparatus according to claim 12, wherein the variable-frequency resonance element further includes a battery and a control circuit, the control circuit being connected to the variable-frequency resonance element.

14. The communication terminal apparatus according to claim 13, wherein the control circuit is configured utilize as power, a current rectified from a high frequency signal radiated from an antenna of the reader/writer.

15. The communication terminal apparatus according to claim 11, wherein a variable frequency band of the variable-frequency resonance element covers the resonant frequency of the antenna resonance circuit.

\* \* \* \* \*